(12) United States Patent
Jiang et al.

(10) Patent No.: US 9,181,374 B2
(45) Date of Patent: Nov. 10, 2015

(54) PROCESS FOR PREPARING BRANCHED POLYMER

(75) Inventors: Bibiao Jiang, Changzhou (CN);
Wenyan Huang, Changzhou (CN);
Hongjun Yang, Changzhou (CN);
Xiaoqiang Xue, Changzhou (CN)

(73) Assignee: CHANGZHOU UNIVERSITY (CN)

( * ) Notice: Subject to any disclaimer, the term of this patent is extended or adjusted under 35 U.S.C. 154(b) by 0 days.

(21) Appl. No.: 14/353,112

(22) PCT Filed: Aug. 14, 2012

(86) PCT No.: PCT/CN2012/080089
§ 371 (c)(1),
(2), (4) Date: Apr. 21, 2014

(87) PCT Pub. No.: WO2013/060182
PCT Pub. Date: May 2, 2013

(65) Prior Publication Data
US 2014/0256898 A1 Sep. 11, 2014

(30) Foreign Application Priority Data

Oct. 27, 2011 (CN) .......................... 2011 1 0331548

(51) Int. Cl.
*C08F 220/30* (2006.01)
*C08F 12/08* (2006.01)
*C08G 83/00* (2006.01)
*C08F 220/28* (2006.01)
*C08L 101/00* (2006.01)

(52) U.S. Cl.
CPC ............... *C08F 220/30* (2013.01); *C08F 12/08* (2013.01); *C08F 220/28* (2013.01); *C08G 83/005* (2013.01); *C08L 101/005* (2013.01)

(58) Field of Classification Search
CPC ...... C08F 220/30; C08F 220/28; C08F 12/08; C08G 83/005; C08L 101/005
USPC .................................. 526/326, 329.2, 329.5
See application file for complete search history.

(56) References Cited

U.S. PATENT DOCUMENTS

| 3,565,822 | A | * | 2/1971 | Bodycot ........................ 502/160 |
| 5,663,252 | A | * | 9/1997 | Pike et al. ...................... 526/216 |
| 5,719,243 | A | | 2/1998 | Alferink et al. |
| 2007/0149705 | A1 | | 6/2007 | Styranec et al. |

OTHER PUBLICATIONS

International Search Report; PCT/CN2012/080089; International File Date: Aug. 14, 2012; Changzhou University; 3 pgs.

* cited by examiner

*Primary Examiner* — Michael M Bernshteyn
(74) *Attorney, Agent, or Firm* — Schmeiser, Olsen & Watts, LLP

(57) ABSTRACT

A polymer synthesis process wherein a vinyl monomer, such as styrene, toluene (benzene, xylene) as a solvent, is subjected to a self-initiated free radical polymerization at 60~100° C. with a compound (methyl(meth)acrylate peroxide) as the initiator and the branched monomer containing both polymerizable double bond and peroxide bond. The degree of branching of the polymer can be adjusted by adjusting the molar ratio of the compound to polymerizable monomer. The process for preparing a branched polymer is carried out under the conditions of conventional free radical polymerization without the addition of the branched monomer and other assist initiators.

5 Claims, 2 Drawing Sheets

PROCESS FOR PREPARING BRANCHED POLYMER

FIELD OF TECHNOLOGY

This invention is about a process for preparing a branched polymer with a new type free radical polymerization initiator, belonging to the fields of polymer synthesis and preparation of functional polymers.

BACKGROUND (Hyper) branched polymers, with the characteristics of low viscosity, high dissolvability and high degree of functionality because of their unique 3D spherical structure, are believed to be amenable for extensive use as viscosity modifier of polymer melt in a number of fields, to prepare coating materials and adhesives with high solids content, carriers of drugs, catalysts, and liquid crystal polymers and photoelectrical materials. It has become a popular subject in the polymer science, as their prospects of application have attracted large numbers of domestic and overseas experts and scholars to investigate them.

Currently, the main processes to synthesizing vinyl branched polymers are live polymerization and conventional free radical polymerization with chain transfer agent. However, live polymerization requires very severe reaction conditions, and the polymerization reaction cost is very high, with limited types of suitable monomers. Compared with live polymerization, conventional free radical polymerization reaction is simple and easy, however, the conventional free radical polymerization reaction systems reported are quite complicated, and large amount of additional agent should be added; the (hyper) branched polymers obtained from the synthesis have low molecular weight with wide distribution; the branching points of the products are weak chemical bonds; the branched monomers themselves are extremely unstable, and the speed and degree of potential branched monomers releasing branched groups are restricted by several factors. These deficiencies have seriously restricted the theoretical research and scaled applications of vinyl branched polymers.

Discovering a simple and cheap synthesizing processes is an important orientation of research of vinyl branched polymers. In this invention, a new type of free radical polymerization initiator containing a polymerisable double bond and peroxide bond is designed to synthesize vinyl monomers into branched polymers under the conventional free radical polymerization, without addition of branched monomer. This invention has important significance to the theoretical research and scaled applications of (hyper) branched polymers.

SUMMARY

This invention has made public a new type of free radical polymerization initiator, which is used to prepare (hyper) branched polymers under the conventional free radical polymerization, without the addition of branched monomer. An aspect relates to the use of a new type of free radical polymerization initiator containing both polymerisable double bond and peroxide bond with good storage stability, which can be used to synthesize the branched polymers under conditional free radical polymerization without addition of branched monomer and other assist initiators. This synthesizing process to prepare (hyper) branched polymers is simple and practical, and can be used at low production cost.

A process to prepare branched polymers in the following steps: polymerization is performed under the conventional free radical polymerization with the compound containing both the peroxide group and a polymerisable double bond as an initiator and branched monomer, vinyl compound as monomer, in which the molar ratio of initiator and monomer is 1:2~200, and the mass ratio of solvent and monomer is 0~1.5:1, the polymerization reaction temperature is controlled in a temperature range of 60~100° C., and the polymerization reaction time is controlled in a range of 8~40 hours.

The peroxide compound containing a polymerisable a double bond is used as initiator and branched monomer used is peroxide (methyl)acrylate containing a polymerisable double bond, with the structural formula as follows:

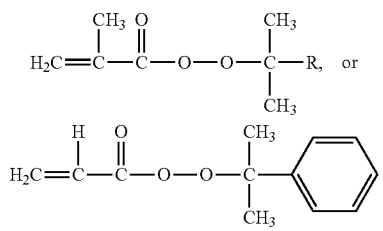

In which R is —$CH_3$ or

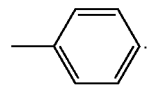

The solvent is toluene, benzene or xylene, etc.

The vinyl monomer is styrene, methacrylic acid monomer, methyl acrylate monomer, propylene derivatives or vinyl acetate monomer.

The polymerization system can be homopolymerization or copolymerization of vinyl monomers.

The polymerizing process can be solution polymerization or bulk polymerization.

The creativity and novelty of this invention: the new type of free radical polymerization initiator contains both polymerisable double bond and peroxide bond with good storage stability, which can be used to synthesize the branched polymers under conditional free radical polymerization without addition of branched monomer and other assist initiators. This synthesizing process to prepare (hyper) branched polymers is simple, feasibile and can be used at low production cost. The degree of branching is can be controlled by adjusting the ratio of initiator to monomer, the polymerization reaction conditions are extremely simple, the operability is good, the monomer conversion rate in polymerization reaction is high, and the cost of polymer production is low.

BRIEF DESCRIPTION

Figure 3:
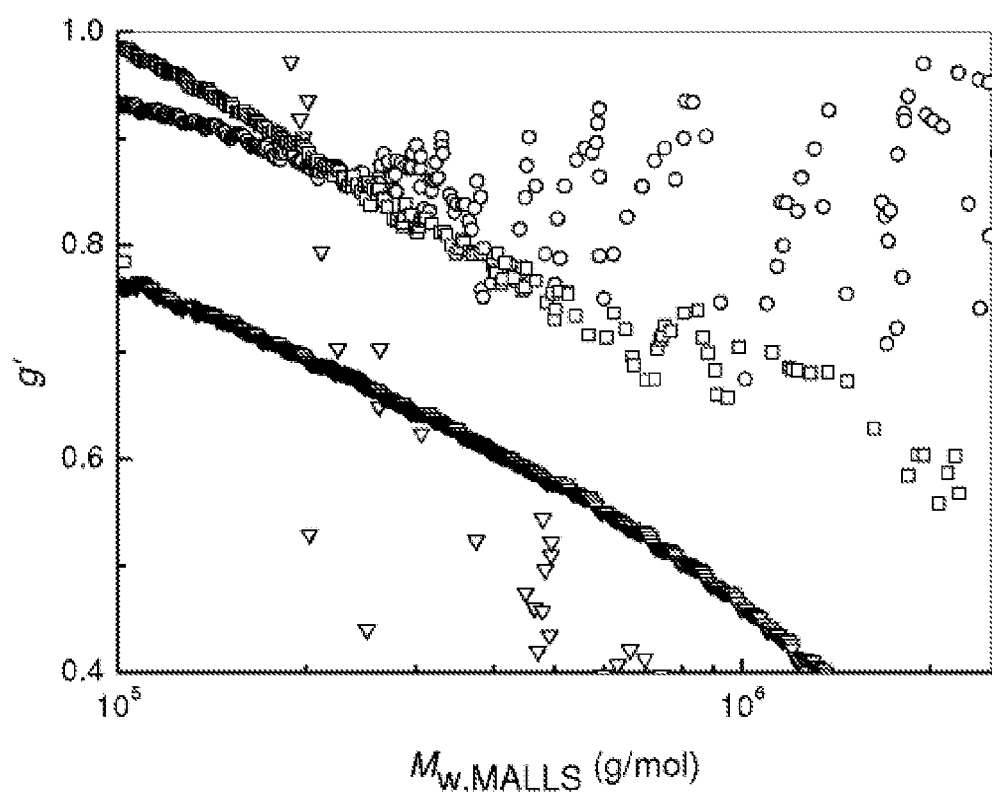

FIG. 3 shows the trend of variation of the branching factor g' of the branched polymer obtained in embodiments 5, 6 and 7, [MMA]:[tert-butyl peroxide methacrylate]=100:0.5 (○), [MA]:[tert-butyl peroxide methacrylate]=100:0.5 (∇), [VAc]:[tert-butyl peroxide methacrylate]=100:0.5(□).

DETAILED DESCRIPTION

Embodiments

The new type of free radical polymerization initiator as described in this invention is peroxide (methyl)acrylate containing a polymerisable double bond, and it is prepared using the methods below:

Method I for Preparing Peroxide (Methyl)Acrylate Containing a Polymerisable Double Bond and Peroxide Bond:

Drop 150 mL of NaOH solution at a mass percentage of 8% into tert-butyl hydroperoxide (17.9992 g, 0.2 mol) dissolved N,N'-dimethylformamide (DMF) (10 mL) added with phenothiazine (0.0193 g, 0.01 mmol), and control the temperature at 0~15° C. After complete addition of phenothiazine, let it react for 60 min to generate a tert-butyl hydroperoxide solution. Then drop and dissolve it in the methylacryloyl chloride (21.0234 g, 0.2 mol) solution of N,N'-dimethylformamide (DMF) (10 mL) and added with phenothiazine (0.0194 g, 0.01 mmol), control the temperature at 0~10° C., and let it react for 3 h after completing addition. Then extract it with petroleum ether, and wash it with distilled water until a transparent water phase is obtained, separate the oil phase and add anhydrous Na$_2$SO$_4$ to dry it, and distill it at reduced pressure to obtain the product tert-butyl peroxide methacrylate, with a total yield of 38.43% at a purity of 92.73%. The structural formula of the product is:

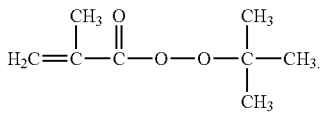

Method II for Preparing Peroxide (Methyl)Acrylate Containing a Polymerisable Double Bond and Peroxide Bond:

Drop 100 mL of NaOH solution at a mass percentage of 20% into isopropylbenzene hydrogen peroxide (30.0004 g, 0.2 mol) solution dissolved in THF (20 mL) and added with phenothiazine (0.0199 g, 0.2 mmol), and control the temperature at 0~15° C. After completing addition, let it react for 60 min to generate a sodium isopropylbenzene peroxide solution. Then drop the methylacryloyl chloride (21.0103 g, 0.2 mol) solution dissolved in THF (20 mL) and added with phenothiazine (0.0198 g, 0.01 mmol), control the temperature at 0~10° C., and let it react for 3 h after completion of addition. Then extract it with petroleum ether, and wash it with distilled water until a transparent water phase is obtained, separate the oil phase and add anhydrous Na$_2$SO$_4$ to dry it, and distill it at reduced pressure to obtain the product isopropylphenyl peroxide methacrylate, with a total yield of 88.21% at a purity of 98.67%. The structural formula of the product is:

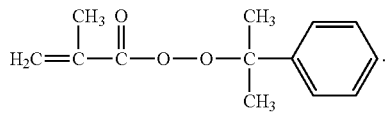

Method III for Preparing Peroxide (Methyl)Acrylate Containing a Polymerisable Double Bond and Peroxide Bond:

Drop 100 mL of NaOH solution at a mass percentage of 10% into isopropylbenzene hydrogen peroxide (29.9924 g, 0.2 mol) solution dissolved in acetone (20 mL) and added with phenothiazine (0.0198 g, 0.2 mmol), and control the temperature at 0~15° C. After completedly adding, let it react for 40 min to generate a sodium isopropylbenzene peroxide solution. Then drop the acryloyl chloride (36.1094 g, 0.4 mol) solution dissolved in acetone (20 mL) and added with phenothiazine (0.0195 g, 0.01 mmol), control the temperature at 0~10° C., and let it react for 3 h after completion of addition. Then extract it with petroleum ether, and wash it with distilled water until a transparent phase is obtained, separate the oil phase and add anhydrous Na$_2$SO$_4$ to dry it, and distill it at reduced pressure to obtain the product isopropylphenyl peroxide acrylate, with a total yield of 79.73% at a purity of 99.02%.

The structural formula of the product is:

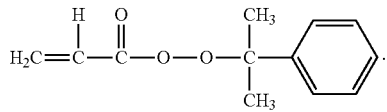

Embodiment 1

Figure 1:
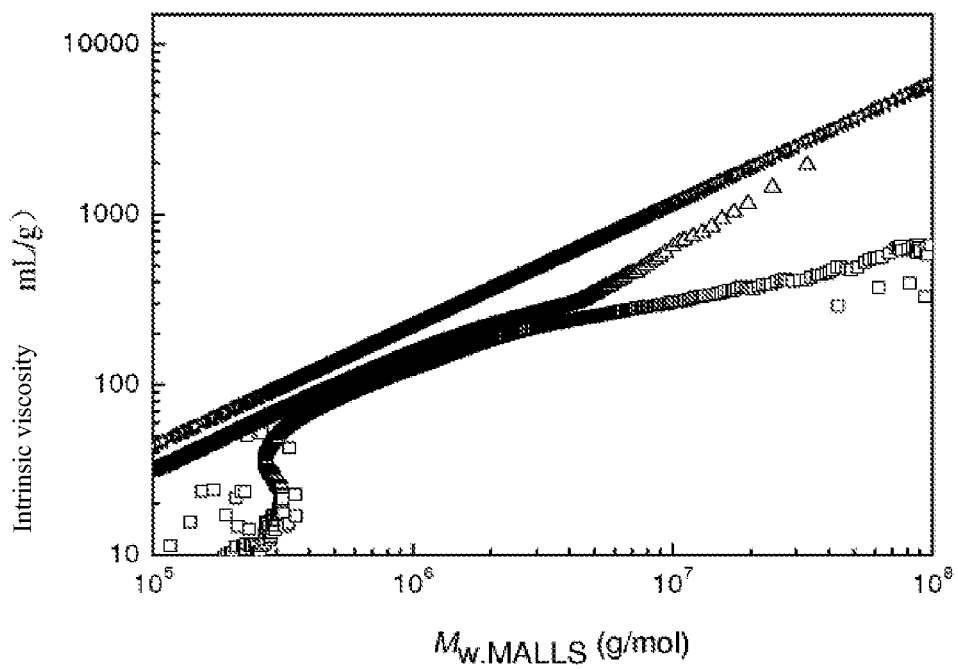
FIG. 1 shows the trend of variation of the intrinsic viscosity of the branched polymer obtained in embodiments 1 and 3 and the corresponding linear polymer vs molecular weight, with linear polystyrene (☆), [styrene]:[tert-butyl peroxide methacrylate]=100:0.5 (□), [styrene]:[isopropylphenyl peroxide methacrylate]=100:0.5 (Δ).
Figure 2:
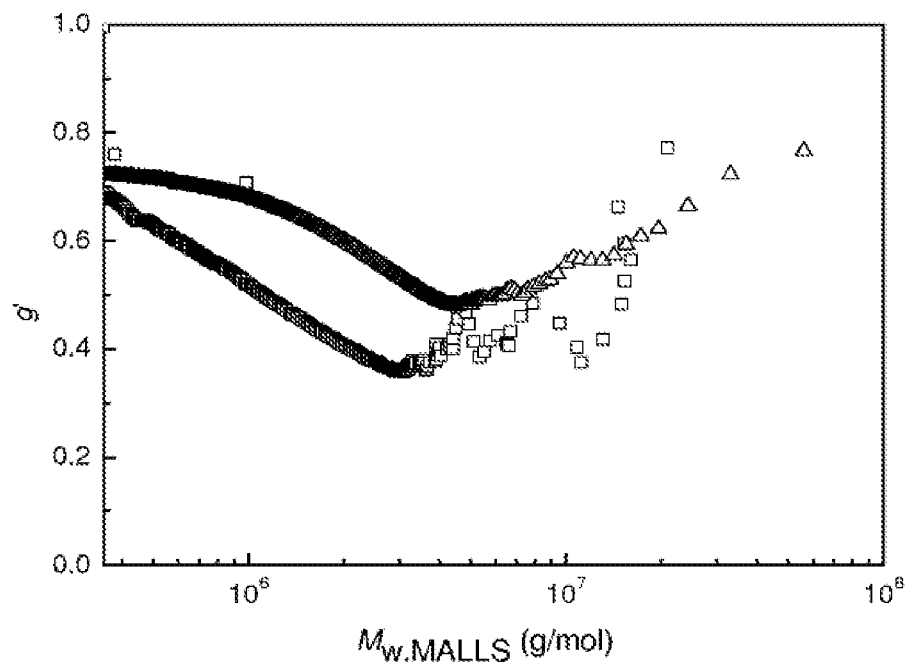
FIG. 2 shows the trend of variation of the branching factor g' of the branched polymer obtained in embodiments 1 and 3 vs molecular weight, with [styrene]:[tert-butyl peroxide methacrylate]=100:0.5 (□), [styrene]:[isopropylphenyl peroxide methacrylate]=100:0.5 (Δ) (g' is the ratio of intrinsic viscosity of branched polymer and linear polymer with the identical molecular weight g'=IV$_{branched}$/IV$_{linear}$; the smaller g' the higher degree of branching).

Add styrene (St 5.2018 g, 0.05 mol), initiator tert-butyl peroxide methacrylate (0.0396 g, 0.25 mmol) and solvent toluene (1.7325 g) into the reaction flask. They were reacted at 85° C. for 40 h, and the styrene conversion rate was found to be 82.59%. Analyze the polymer with a three-measurement gel permeation chromatograph, and the following result is obtained: light scattering weight-average molecular weight M$_{w\cdot MALLS}$=418400, gel permeation chromatography weight-average molecular weight M$_{w\cdot GPC}$=253200, molecular weight distribution PDI=4.72, Mark-Houwink index α=0.455, as shown by the Mark-Houwink curve in FIG. 1; average branching factor g'=0.533, which proves that the obtained polymer has branching structure. Refer to FIG. 2 for the variation trend of the branching factor g' and molecular weight of the branched polymer.

Embodiment 2

Add styrene (5.2102 g, 0.05 mol), initiator tert-butyl peroxide methacrylate (0.0393 g, 0.25 mmol), and solvent toluene (1.7288 g) into the reaction flask. They were reacted at 60° C. for 40 h, and the styrene conversion rate was found to be 65.31%. Analyze the polymer with a three-measurement gel permeation chromatograph, and the following result is obtained: light scattering weight-average molecular weight M$_{w\cdot MALLS}$=1284000 g/mol, gel permeation chromatography weight-average molecular weight M$_{w\cdot GPC}$=460100 g/mol, molecular weight distribution PDI=4.82, Mark-Houwink index α=0.536, average branching factor g'=0.384, which proves that the obtained polymer has branching structure.

Embodiment 3

Add styrene (5.2099 g, 0.05 mol), initiator isopropylphenyl peroxide methacrylate (0.0527 g, 0.25 mmol), and solvent toluene (1.7348 g) into the reaction flask. They were reacted at 100° C. for 8 h, and the styrene conversion rate was found to be 81.05%. Analyze the polymer with a three-measurement gel permeation chromatograph, and the following result is obtained: light scattering weight-average molecular weight $M_{w\cdot MALLS}$=782100 g/mol, gel permeation chromatography weight-average molecular weight $M_{w\cdot GPC}$=433900 g/mol, molecular weight distribution PDI=6.69, Mark-Houwink index $\alpha$=0.576, as shown by the Mark-Houwink curve in FIG. 1; the average branching factor g'=0.658, which proves that the obtained polymer has branching structure. Refer to FIG. 2 for the variation trend of the branching factor g' and molecular weight of the branched polymer.

Embodiment 4

Add styrene (5.2131 g, 0.05 mol), initiator isopropylphenyl peroxide methacrylate (0.0516 g, 0.25 mmol), and solvent toluene (1.7318 g) into the reaction flask. They were reacted at 90° C. for 27 h, and the styrene conversion rate was found to be 76.10%. Analyze the polymer with a three-measurement gel permeation chromatograph, and the following result is obtained: light scattering weight-average molecular weight $M_{w\cdot MALLS}$=888500 g/mol, gel permeation chromatography weight-average molecular weight $M_{w\cdot GPC}$=356100 g/mol, molecular weight distribution PDI=8.54, Mark-Houwink index $\alpha$=0.638, average branching factor g'=0.667, which proves that the obtained polymer has branching structure.

Embodiment 5

Add methyl methacrylate (MMA 5.0036 g, 0.05 mol), initiator tert-butyl peroxide methacrylate (0.0391 g, 0.25 mmol), and solvent xylene (1.0071 g) into the reaction flask. They were reacted at 85° C. for 30 h, and the methyl methacrylate conversion rate was found to be 98.97%. Analyze the polymer with a three-measurement gel permeation chromatograph, and the following result is obtained: light scattering weight-average molecular weight $M_{w\cdot MALLS}$=68200 g/mol, gel permeation chromatography weight-average molecular weight $M_{W\cdot GPC}$=40500 g/mol, molecular weight distribution PDI=2.11, Mark-Houwink index $\alpha$=0.597, average branching factor g'=0.578, which proves that the obtained polymer has branching structure. Refer to FIG. 2 for the variation trend of the branching factor g' and molecular weight of the branched polymer.

Embodiment 6

Add vinyl acetate (VAc 4.3019 g, 0.05 mol), initiator tert-butyl peroxide methacrylate (0.0393 g, 0.25 mmol), and solvent benzene (1.4268 g) into the reaction flask. They were reacted at 70° C. for 30 h, and the vinyl acetate conversion rate was found to be 88.10%. Analyze the polymer with a three-measurement gel permeation chromatograph, and the following result is obtained: light scattering weight-average molecular weight $M_{w\cdot MALLS}$=77240 g/mol, gel permeation chromatography weight-average molecular weight $M_{w\cdot GPC}$=65400 g/mol, molecular weight distribution PDI=1.95, Mark-Houwink index $\alpha$=0.654, average branching factor g'=0.674, which proves that the obtained polymer has branching structure. Refer to FIG. 2 for the variation trend of the branching factor g' and molecular weight of the branched polymer.

Embodiment 7

Add methyl acrylate (MA 4.3021 g, 0.05 mol), initiator tert-butyl peroxide methacrylate (0.0791 g, 0.5 mmol), and solvent toluene (1.7331 g) into the reaction flask. They were reacted at 80° C. for 25 h, and the methyl methacrylate conversion rate was found to be 89.37%. Analyze the polymer with a three-measurement gel permeation chromatograph, and the following result is obtained: light scattering weight-average molecular weight $M_{w\cdot MALLS}$=73700 g/mol, gel permeation chromatography weight-average molecular weight $M_{w\cdot GPC}$=60600 g/mol, molecular weight distribution PDI=2.77, Mark-Houwink index $\alpha$=0.659, average branching factor g'=0.702, which proves that the obtained polymer has branching structure. Refer to FIG. 2 for the variation trend of the branching factor g' and molecular weight of the branched polymer.

Embodiment 8

Add styrene (5.2172 g, 0.05 mol), initiator tert-butyl peroxide methacrylate (2.3864 g, 0.025 mol), and solvent toluene (7.6342 g) into the reaction flask. They were reacted at 85° C. for 24 h, and the styrene conversion rate was found to be 98.29%. Analyze the polymer with a three-measurement gel permeation chromatograph, and the following result is obtained: light scattering weight-average molecular weight $M_{w\cdot MALLS}$=23500 g/mol, gel permeation chromatography weight-average molecular weight $M_{w\cdot GPC}$=19700 g/mol, molecular weight distribution PDI=4.04, Mark-Houwink index $\alpha$=0.420, average branching factor g'=0.388, which proves that the obtained polymer has branching structure.

Embodiment 9

Add styrene (5.1970 g, 0.05 mol), initiator isopropylphenyl peroxide methacrylate (5.5045 g, 0.025 mol), and solvent toluene (2.6782 g) into the reaction flask. They were reacted at 80° C. for 21 h, and the styrene conversion rate was found to be 73.80%. Analyze the polymer with a three-measurement gel permeation chromatograph, and the following result is obtained: light scattering weight-average molecular weight $M_{w\cdot MALLS}$=64500 g/mol, gel permeation chromatography weight-average molecular weight $M_{w\cdot GPC}$=12900 g/mol, molecular weight distribution PDI=8.37, Mark-Houwink index $\alpha$=0.588, average branching factor g'=0.570, which proves that the obtained polymer has branching structure.

Embodiment 10

Add styrene (5.2009 g, 0.05 mol), initiator isopropylphenyl peroxide methacrylate (0.6238 g, 3 mmol), and solvent toluene (2.7373 g) into the reaction flask. They were reacted at 85° C. for 40 h, and the styrene conversion rate was found to be 94.31%. Analyze the polymer with a three-measurement gel permeation chromatograph, and the following result is obtained: light scattering weight-average molecular weight $M_{w\cdot MALLS}$=2675000 g/mol, gel permeation chromatography weight-average molecular weight $M_{w\cdot GPC}$=280700 g/mol, molecular weight distribution PDI=16.36, Mark-Houwink index $\alpha$=0.447, average branching factor g'=0.365, which proves that the obtained polymer has branching structure.

Embodiment 11

Add styrene (5.1919 g, 0.05 mol) and initiator tert-butyl peroxide methacrylate (0.0790 g, 0.5 mmol) into the reaction flask. They were reacted at 80° C. for 36 h, and the styrene conversion rate was found to be 96.1%. Analyze the polymer with a three-measurement gel permeation chromatograph, and the following result is obtained: light scattering weight-average molecular weight $M_{w\text{-}MALLS}$=169000 g/mol, gel permeation chromatography weight-average molecular weight $M_{w\text{-}GPC}$=118500 g/mol, molecular weight distribution PDI=4.57, Mark-Houwink index $\alpha$=0.574, average branching factor g'=0.770, which proves that the obtained polymer has branching structure.

Embodiment 12

Add styrene (5.2032 g, 0.05 mol) and initiator isopropylphenyl peroxide methacrylate (1.0406 g, 5 mmol) into the reaction flask. They were reacted at 95° C. for 36 h, and the styrene conversion rate was found to be 97.6%. Analyze the polymer with a three-measurement gel permeation chromatograph, and the following result is obtained: light scattering weight-average molecular weight $M_{w\text{-}MALLS}$=778100 g/mol, gel permeation chromatography weight-average molecular weight $M_{w\text{-}GPC}$=252200 g/mol, molecular weight distribution PDI=22.44, Mark-Houwink index $\alpha$=0.440, average branching factor g'=0.495, which proves that the obtained polymer has branching structure.

Embodiment 13

Add styrene (5.1221 g, 0.05 mol) and initiator isopropylphenyl peroxide acrylate (0.1034 g, 0.5 mmol) into the reaction flask. They were reacted at 80° C. for 36 h, and the styrene conversion rate was found to be 91.7%. Analyze the polymer with a three-measurement gel permeation chromatograph, and the following result is obtained: light scattering weight-average molecular weight $M_{w\text{-}MALLS}$=855500 g/mol, gel permeation chromatography weight-average molecular weight $M_{w\text{-}GPC}$=370300 g/mol, molecular weight distribution PDI=8.88, Mark-Houwink index $\alpha$=0.612, average branching factor g'=0.508, which proves that the obtained polymer has branching structure.

The invention claimed is:

1. A process to prepare branched polymers comprising:
performing a self-initiated free radical polymerization with a compound containing both a polymerisable double bond and a peroxide bond, which is used as an initiator and a branched monomer, vinyl monomer as a monomer, in which a molar ratio of the compound and the monomer is 1:2~200, and a mass ratio of a solvent and the monomer is 0~1.5:1, wherein the compound containing both the polymerisable double bond and the peroxide bond is peroxide (methyl)acrylate with a structural formula as follows:

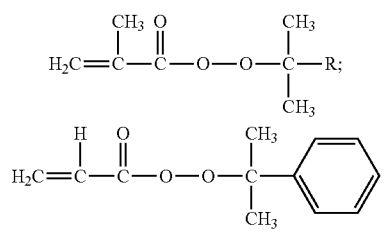

wherein R is —CH3 or

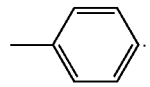

and a polymerization reaction temperature is controlled at 60~100° C., and a polymerization reaction time controlled is 8~40 hours.

2. The process to prepare branched polymers as described in claim 1, wherein the solvent is selected from the group consisting of toluene, benzene and xylene.

3. The process to prepare branched polymers as described in claim 1, wherein the vinyl monomer is selected from the group consisting of styrene, methacrylic acid monomer, methyl(meth)acrylate monomer, propylene derivatives and vinyl acetate monomer.

4. The process to prepare branched polymers as described in claim 1, wherein the polymerization system in it is either homopolymerization or copolymerization of vinyl monomers.

5. The process to prepare branched polymers as described in claim 1, wherein the polymerization process is either a solution polymerization or a bulk polymerization.

* * * * *